July 18, 1950  F. J. MURRAY  2,515,888

METHOD AND APPARATUS FOR SOLVING MATHEMATICAL PROBLEMS

Filed April 15, 1948  5 Sheets-Sheet 1

INVENTOR
FRANCIS J. MURRAY
BY
Van Deventer, Grier & Shively
ATTORNEYS

July 18, 1950         F. J. MURRAY         2,515,888

METHOD AND APPARATUS FOR SOLVING MATHEMATICAL PROBLEMS

Filed April 15, 1948         5 Sheets-Sheet 3

INVENTOR
FRANCIS J. MURRAY
BY
ATTORNEYS

July 18, 1950      F. J. MURRAY      2,515,888

METHOD AND APPARATUS FOR SOLVING MATHEMATICAL PROBLEMS

Filed April 15, 1948      5 Sheets-Sheet 5

Fig. 4a.

INVENTOR
FRANCIS J. MURRAY
BY
ATTORNEYS

Patented July 18, 1950

2,515,888

UNITED STATES PATENT OFFICE 2,515,888

METHOD AND APPARATUS FOR SOLVING MATHEMATICAL PROBLEMS

Francis J. Murray, New York, N. Y.

Application April 15, 1948, Serial No. 21,215

20 Claims. (Cl. 235—61)

The present invention pertains to improvements in methods and apparatus for solving mathematical problems.

An object of the invention is to provide a method of solving simultaneous linear equations by combining arbitrary quantitative physical factors representative of the various unknowns and their coefficients in such a manner as to produce a single indication representative of a combined initial error factor, and varying the quantities representing the unknowns until the indicated error becomes zero, whereby the final entered quantities representative of the unknowns may indicate the solution of the problem.

Another object is to provide suitable apparatus for carrying out the method.

A further object is to provide apparatus of the above nature operable by electricity.

A still further object is to provide suitable electrical apparatus of the above type in two categories, namely a first embodiment which is of maximum simplicity and cheapness and is adapted to yield results with generally practical or "slide-rule" accuracy, and an alternative embodiment in which accuracy may be carried to the highest degree of precision.

Other objects and advantages will become evident during the course of the following description in connection with the accompanying drawings, in which.

In order to promote clarity in explaining the purpose and operation of the apparatus itself, the nature and properties of the mathematical equations to be solved will first be set forth. For maximum simplicity the demonstration apparatus herein described is devised for the solution of two simultaneous equations involving two variables X and Y. It will become evident however, that the invention is applicable to any desired number of equations and variables.

Consider first a pair of simultaneous linear equations $$a_{1,1}X + a_{1,2}Y + b_1 = 0 \qquad (1)$$
$$a_{2,1}X + a_{2,2}Y + b_2 = 0 \qquad (2)$$

in which

X and Y are the required unknowns;
$a_{1,1}$ and $a_{2,1}$ are the coefficients of X in the first and second equations respectively;
$a_{1,2}$ and $a_{2,2}$ are the coefficients of Y in the two equations; and
$b_1$ and $b_2$ are the constants in the two equations.

Since the solution must be carried out with instruments of finite range and since widely varying magnitudes of unknowns are to be encountered in solving different problems, it is desirable to introduce a third or gage variable T, by which the scale of the solving process may be kept within the practical scope of the instruments and by which the most precise utilization of the latter may be obtained.

Introducing the gage variable T converts the above equations to $$a_{1,1}x + a_{1,2}y + b_1 T = \epsilon_1 \qquad (3)$$
$$a_{2,1}x + a_{2,2}y + b_2 T = \epsilon_2 \qquad (4)$$

If both $\epsilon_1$ and $\epsilon_2$ can be reduced to zero, the last written equations may be rewritten $$a_{1,1}\frac{x}{T} + a_{1,2}\frac{y}{T} + b_1 = 0 \qquad (5)$$

$$a_{2,1}\frac{x}{T} + a_{2,2}\frac{y}{T} + b_2 = 0 \qquad (6)$$

Comparing these forms with the original equation, it will be evident that with zero condition of $\epsilon_1$ and $\epsilon_2$, $$\frac{x}{T} = X$$

and $$\frac{y}{T} = Y$$

that is $$\frac{x}{T}$$

and $$\frac{y}{T}$$

constitute the solution of the original problem.

The factors $\epsilon_1$ and $\epsilon_2$ give a working medium for solving the problem, since they can be realized for all values of $x$, $y$, and T in a suitable range and at least one is not zero if the values of $x$, $y$, and T are incorrect. $\epsilon_1$ and $\epsilon_2$ may therefore be termed factors of error, and it follows that by introducing different values of $x$ and $y$ until both error factors become zero or not detectably different therefrom, the final $x$ and $y$ entries, together with the chosen gage value T, determine the desired solution.

To detect the elimination of $\epsilon_1$ and $\epsilon_2$ in a single solution, it is desirable to arrive at a single expression which is a function of both $\epsilon_1$ and $\epsilon_2$, and which is adaptable to physical representation on a meter scale by which the elimination of these factors may be observed. Such an expression is the definition:

$$\mu = \epsilon_1^2 + \epsilon_2^2$$

Since in the use of this expression actual physical phenomena are to be involved throughout, $\epsilon_1$ and $\epsilon_2$ appear as real quantities, and it becomes evident that when $\mu = 0$, $$\epsilon_1 = 0 \text{ and } \epsilon_2 = 0$$

Figure 3:
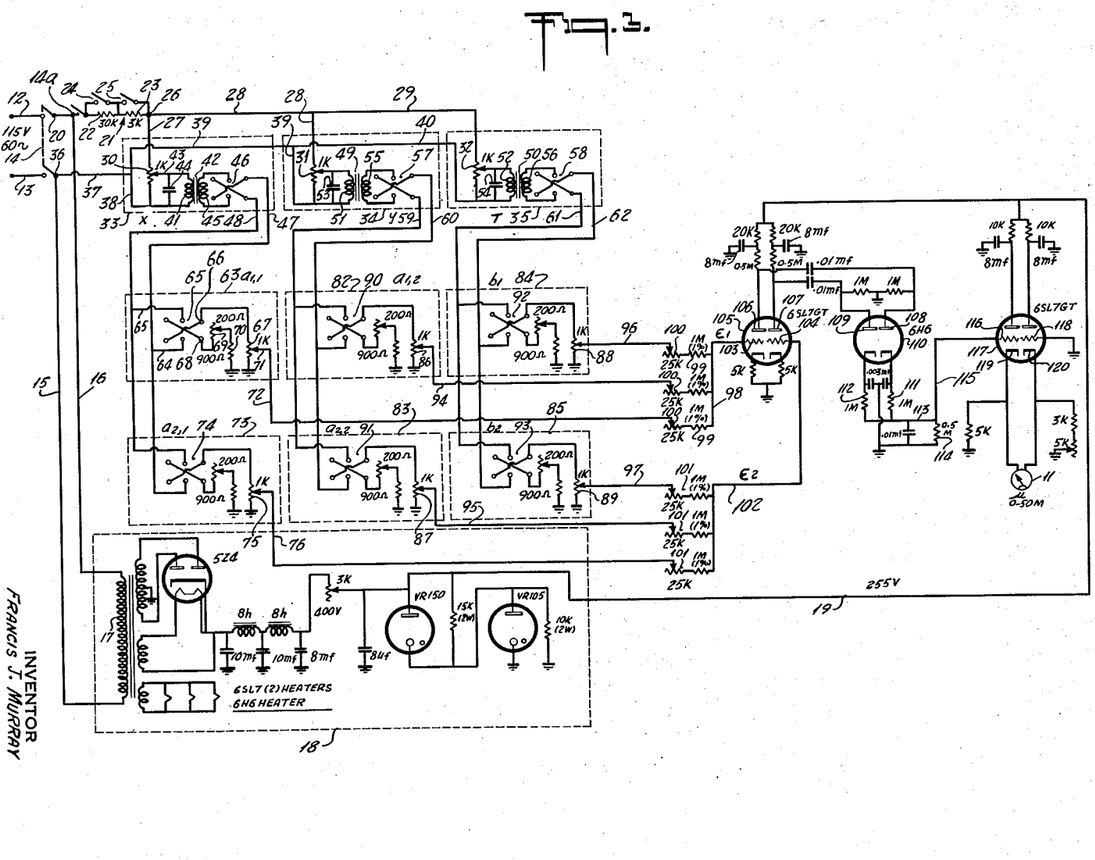
Figure 3 is a detail, schematic wiring diagram of the type of instrument shown in Figure 1.

In the form of the invention shown in Figure 1, electrical values corresponding to the coefficients and unknowns are entered by means of various switches and controller knobs mounted on a panel 10 as hereinafter set forth in detail, and the elimination of error, or $\mu$, is observed on a meter 11. The means by which the process is carried out is as follows, referring to Figure 3:

The device is provided with current by a pair of 110 volt 60 cycle supply conductors 12 and 13 via a double-pole main switch 14. A pair of leads 15 and 16 connect the supply inside the switch 14 to a transformer 17 forming the input of a suitable power supply and rectifier unit 18 adapted to furnish D. C. current at about 225 volts through an output conductor 19, the other lead being ground. As the power supply unit 18 may be of well known type and is not per se an object of the present invention, further detail description herein is unnecessary.

One inside pole 20 of the main switch is also connected via a switch 14a to what may be termed a network 21 comprising two resistors 22 and 23 connected in series, the resistance of 22 having a value ten times that of resistor 23. A switch 24 is connected across resistor 22, and a similar switch 25 is connected across resistor 23.

The output terminal 26 of the network 21 has a parallel connection via conductors 27, 28 and 29 as shown, with corresponding fixed terminals of three potentiometers 30, 31 and 32 forming parts respectively of three identical groups of apparatus 33, 34 and 35 hereinafter referred to as the $x$, $y$ and T variable groups respectively.

Second signal or current connections to the variable groups 33, 34 and 35 are made from the second inner pole 36 of the main switch 14 via a conductor 37 and branches 38, 39 and 40 forming parallel connections respectively to the second fixed terminals of potentiometers 30, 31 and 32.

Taking the $x$ group 33 as typical of the three identical groups, the supply branch 38 is also connected to one side of the primary 41 of a 10 to 1 step-down transformer 42, the other side of the primary being connected to the movable electrode 43 of the potentiometer 30. A resonating condenser 44 is connected in parallel with the primary 41. The secondary winding 45 of the transformer 42 leads via a reversing switch 46 to output conductors 47 and 48.

Similarly, the $y$ and T groups 34 and 35 have identically connected step-down transformers 49 and 50 with their respective primaries 51 and 52 resonated by condensers 53 and 54 and with their secondaries 55 and 56 connected to reversing switches 57 and 58. Switch 57 has output leads 59 and 60, while switch 58 has similar leads 61 and 62.

The numeral 63 generally denotes a resistance unit hereinafter referred to as the $a_{1,1}$ coefficient group and having branch leads 64 and 65 respectively from the output leads 47 and 48 of the $x$ variable group 33 to a reversing switch 65. One pole 66 of the switch 65 is connected through the fixed resistance of a potentiometer 67 to ground, while the second switch pole 68 is connected through a variable resistor 69 and a fixed resistor 70 in series to ground. The series resistance of 69 and 70 is made equal to the total fixed resistance of the potentiometer 67, the variable resistor 69 being adjustable to permit exact matching. By this means, the current load flowing through the group 63 is balanced about ground except for the relatively very small current through conductor 72. The movable contact 71 of the potentiometer 67 has an output lead 72, the further connection of which will be described hereafter.

A second resistance group 73, hereinafter referred to as the $a_{2,1}$ coefficient group, is also connected through its reversing switch 74 to the output conductors 47 and 48 of the $x$ variable group 63. A potentiometer 75, identical with potentiometer 67 of group 63, is connected to a variable output lead 76.

The fixed resistance of potentiometer 75 is matched by the series resistance of a variable resistor 77 and fixed resistor 78 to balance the load about ground in the same manner as described for group 63.

Since groups 73 and 63 are connected in parallel via the leads 47 and 48 to the secondary 45 of the transformer, and since the loads of both the latter groups are balanced about ground, the load of the secondary 45 is also so balanced about ground.

When any desired voltage representing ten times the variable $x$ and determined by the setting of the potentiometer 30 is impressed on the primary 41, the instantaneous voltage of one terminal of the secondary relative to ground is $x \cos wt$ and that of the other terminal is $-x \cos wt$. Thus, the potentials of the output leads 47 and 48 relative to ground are $x \cos wt$ and $-x \cos wt$ in one position of the reversing switch 46 and have the reverse values in the other switch position.

Figure 1:
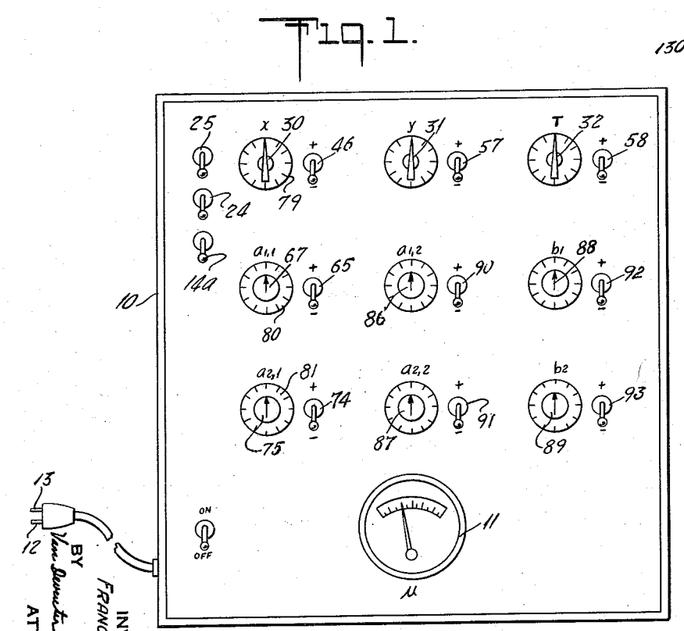
Figure 1 is a front elevation of an instrument embodying the simplified form of the invention.

The primary potentiometer 30 is calibrated directly in terms of $x$ on a dial 79, Figure 1. Thus it will be seen that the potentiometer 30 serves as a means of entering values of $x$, while the reversing switch 46 provides means to determine the sign of $x$.

From the described connections it will be evident that the potential of the output lead 72 of the $a_{1,1}$ coefficient group 63, neglecting line resistances which are so small as to be negligible in proportion to the main circuit resistances, is the output potential of the $x$ variable group modified by the setting of the potentiometer 67. The setting of 67 thus corresponds to the value of $a_{1,1}$, the coefficient of $x$ in the potential expression:

$$a_{1,1} x \cos wt$$

and the dial 80 of potentiometer 67, Figure 1 is calibrated to permit entry of the desired value of $a_{1,1}$. The sign of the entered coefficient may be made either plus or minus by means of the reversing switch 65 which interchanges the connections of group 63 with the leads 47 and 48.

From the foregoing it will be seen that the potential of the output lead 72 represents the mathematical expression:

$$a_{1,1}x \cos wt$$

Similarly, the output potentiometer 75 of group 73 has a calibrated setting dial 81, Figure 1, and the potential of the output lead 76 represents the expression $a_{2,1}x \cos wt$.

The numerals 82, 83, 84 and 85, Figure 3, represent four more resistance groups identical in structure and having output potentiometers 86, 87, 88, 89 and reversing or sign switches 90, 91, 92, 93.

The groups 82 and 83 are connected in parallel to the output conductors 59 and 60 of the $y$ variable entry group 34, and by the same process described with respect to groups 63 and 64, the potentials of the output leads 94 and 95 of groups 82 and 83 are respectively $a_{1,2}y \cos wt$ and $a_{2,2}y \cos wt$, where $y$ is represented by the setting of the input potentiometer 31 and $a_{1,2}$ and $a_{2,2}$ by the settings of output potentiometers 86 and 87.

Similarly, the groups 84 and 85 are connected in parallel to the output leads 61 and 62 of the T or gage variable entry group 35, and the potentials of their output leads 96 and 97 respectively are $b_1T \cos wt$ and $b_2T \cos wt$, $b_1$ and $b_2$ being represented by the settings of output potentiometers 88 and 89.

The output leads 72, 94 and 96 are connected to a common conductor 98 through parallel matched resistors each comprising a fixed wirewound resistor 99 and a variable resistor 100 provided for fine adjustment in matching. By this means the three potentials are averaged, yielding a voltage in conductor 98 proportioned to $$(a_{1,1}x + a_{1,2}y + b_1T) \cos wt = \epsilon_1 \cos wt$$

and since $\cos wt$ is a factor common to both sides, the voltage of conductor 98 is proportional to $$a_{1,1}x + a_{1,2}y + b_1T = \epsilon_1 \quad (3)$$

In the same manner as described above, the potentials of output leads 76, 95 and 97 are averaged through three parallel matched resistor combinations 101 connected to a common conductor 102 having a potential proportional to $$a_{2,1}x + a_{2,2}y + b_2T = \epsilon_2 \quad (4)$$

The conductors 98 and 102 are connected respectively to the grids 103 and 104 of a double triode tube 105 having corresponding plates 106 and 107. The tube 105 serves as an amplifier, and as the various connections of such tubes are well known in the electronic art, further detail description herein is unnecessary. The plates 106 and 107 are capacitatively connected to the plates 108 and 109 respectively of a double diode tube 110.

The two output currents of the diode 110 are led through matched resistors 111 and 112 to a common conductor 113 which carries the sum of the two currents to ground through a single resistor 114, the resistance of 114 being equal to the effective parallel resistance of resistors 111 and 112. The potential of the common conductor is impressed via a lead 115 on one grid 116 of a second double triode amplifier tube 117. The second grid 118 of triode 117 is connected to ground. The micro-ammeter 11 is connected across the two cathodes 119 and 120 of the tube 117.

From the foregoing it will be evident that changes in the reading of the micro-ammeter 11 are a measure of changes in the potential of the common output conductor 113 which carries the sum of the two outputs of the diode 110.

One of the characteristics of a diode tube is that its output is proportional to the square of the input. Since the two inputs to the diode 110 are directly proportional via the double triode 105 to the input potentials $\epsilon_1$ and $\epsilon_2$ of the latter, it follows that the outputs of diode 110 are proportional to $\epsilon_1^2$ and $\epsilon_2^2$. Furthermore, the potential of the common output conductor 113, which carries the sum of the two outputs of diode 110 is proportional to the sum of $\epsilon_1^2$ and $\epsilon_2^2$ and since as noted, changes in the reading of micro-ammeter 11 are directly proportional to changes in the potential of conductor 113, the changes in the reading give an indication of the changes in $\epsilon_1^2 + \epsilon_2^2$.

Since the object throughout is not to determine electrical quantities but relations between them, as entered in terms of the variables $x$ and $y$, the reading of the meter 11 may be interpreted as representing the term $\mu$ in the expression $$\mu = \epsilon_1^2 + \epsilon_2^2 \quad (7)$$

Again, since the solution of the problem involves the elimination of the error factors $\epsilon_1$ and $\epsilon_2$, the solution depends not on a specific positive value reading of $\mu$, but on its reduction to zero. Thus the use of the amplifier tubes 105 and 117 does not change the proportions of the variables $x$ and $y$ or the error factors $\epsilon_1$ and $\epsilon_2$, but simply serves to increase the amplitude of the movement of the meter 11, whereby the minimizing and reduction of $\mu$ to zero may be observed with maximum precision.

Figure 2:
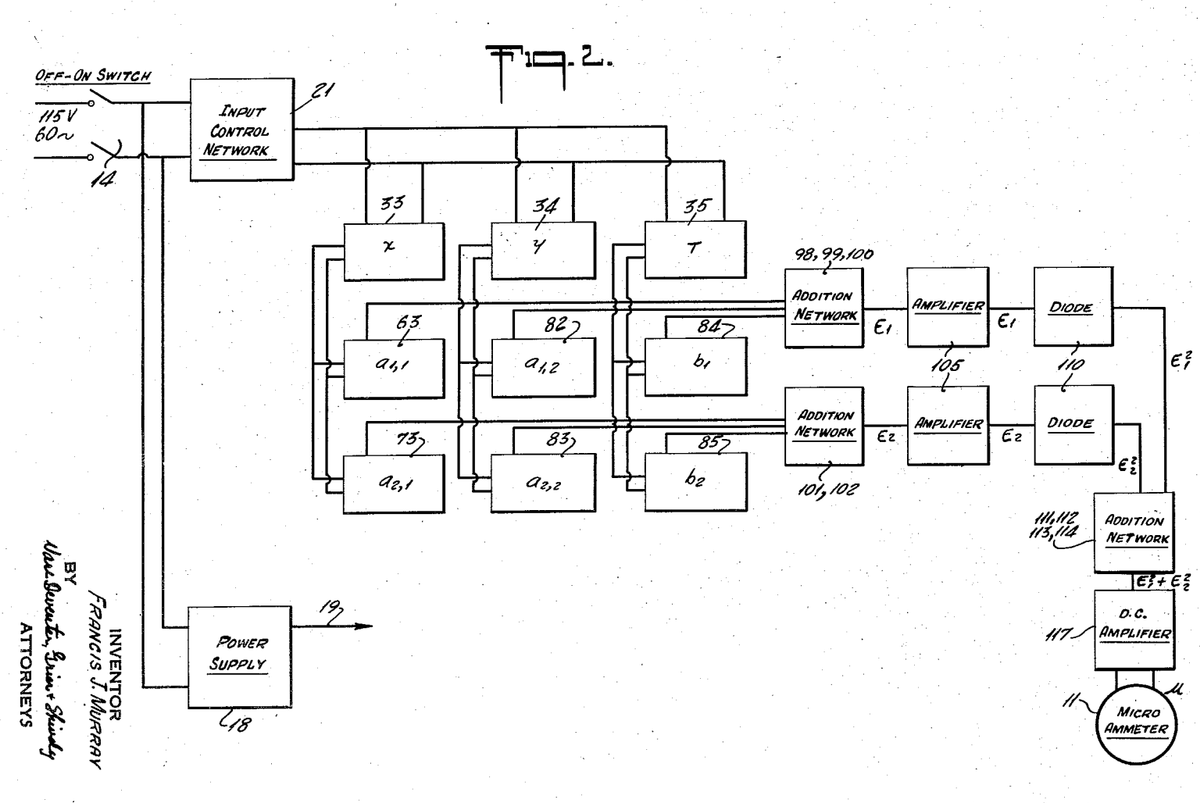
Figure 2 is a schematic or flow diagram showing the general arrangement of the functional sub-assemblies.

The relationship of the various described groups of apparatus and their functions in the derivation of $\mu$ are illustrated in simplified form on the flow diagram, Figure 2. Since the two equational circuits remain functionally separate until their combination in the final addition network 111, 112, 113 and 114, the double triode tube 105 and the double diode 110 are shown on the flow diagram by two separate boxes each. Actually a pair each of single triodes and single diodes may be used if desired, but the double tubes are preferred in practice for maximum simplicity.

*Operation*

The general method of operation is to enter trial values of the unknowns $x$ and $y$, enter a tentative value of the gage variable T, enter the known values of the coefficients $a_{1,1}$, $a_{1,2}$, $a_{2,2}$, $b_1$ and $b_2$ with the proper signs, observe the indication of $\mu$ on the meter 11, then vary the settings of $x$ and $y$ until the indicated $\mu$ becomes zero. If upon initial entry it appears that the entered value of T is not such as to place the operation in proper range of the instruments, a different setting of T is substituted until the proper range is secured. When the meter 11 indicates $\mu = 0$, the settings of $x$ and $y$ are divided by the setting of T, and the two quotients give the desired solution of the original Equations 1 and 2, since as previously pointed out, when $\epsilon_1$ and $\epsilon_2$ each $= 0$, $$\frac{x}{T} = X \text{ and } \frac{y}{T} = Y$$

It is clear that any method of adjusting $x$ and $y$ which results in $\mu = 0$ can be used in this device.

One such method is the following. One entry, for example $y$, is left constant and $x$ is varied until the indicated $\mu$ is minimized, that is until any further variation of $x$ in any direction causes an increase in $\mu$. Then $x$ is held constant and $y$ is varied until $\mu$ is minimized relative to $y$. This process is continued, alternating between $x$ and $y$ until $\mu$ is not sensibly different from zero.

The strength of the electrical signal $\mu$ is determined by the control network 21. Initially a weak signal is sufficient to indicate $\mu$ but as the error factors $\epsilon_1$ and $\epsilon_2$ are lessened in the adjusting process, $\mu$ assumes smaller and smaller values on the meter. To compensate for this, the signal strength is increased by shunting the various resistors in the network 21. Thus the sensitivity of the device to $\mu$ and consequently to the error factors $\epsilon_1$ and $\epsilon_2$ is increased as these become smaller.

Simply stated, with respect to the two equations being used as examples, the above method makes use of the fact that when incorrect trial entries of the unknowns $x$ and $y$ result in errors $\epsilon_1$ and $\epsilon_2$ in the two simultaneous equations, the nearer either variable may be brought to its correct value, the less will become the errors and consequently the sum of their squares as indicated by $$\mu = \epsilon_1^2 + \epsilon_2^2$$

While for the purposes of simplicity the foregoing explanation was carried out with respect to the two equations of two variables and related apparatus under immediate illustrative consideration, it will be proved mathematically hereinafter that the method of successive minimization of $\mu$ with respect to unknowns may be correctly applied to any desired number of variables and corresponding simultaneous linear equations.

The successive actual steps taken in solving equations as outlined above may best be illustrated by an example as follows:

$$.4X + .8Y = .8$$
$$.5X - .7Y = .32$$

which may be re-written as $$.4X + .8Y - .8 = 0$$
$$.5X - .7Y - .32 = 0$$

The input switch 14a is first opened and the switches 24 and 25 are also placed in open position. This position of both switches 24 and 25 will hereinafter be referred to as "low input" position, as it requires any circuit current to pass through resistors 22 and 23 in series. A second position, in which switch 24 is closed and switch 25 opened will be termed "medium input" position, since only resistor 23 must be traversed by the current. Closed position of both switches 24 and 25 will be termed "high input" position, as it by-passes both resistors and allows full line voltage to be applied to the determining apparatus.

With input switch 14a open, the line switch 14 is closed, energizing the power supply and rectifying unit 18 to warm up the various tubes of the apparatus. During this process the coefficient potentiometers 67, 75, 86, 87, 88 and 89 are shifted respectively to dial positions of .4, .5, .8, .7, .8 and .32 and the reversing or sign switches 91, 92 and 93 are thrown to "minus" position, since in the given equations the coefficients $b_1(=-.8)$, $a_{2,2}(=-.7)$, and $b_2(=-.32)$ carry the negative sign.

The $x$ potentiometer 30, the $y$ potentiometer 31 and the T potentiometer 32 are set to zero dial position and the input switch 14a is closed, energizing the determining apparatus.

A tentative setting of T is made on the dial of potentiometer 32, for example .2. The input control switches being in "low input" position, only a small value of $\mu$ appears on the meter 11. The input control is shifted to "medium" position and $\mu$ then reads approximately 15 (the exact numerical value is not significant) which is a large enough dial figure to work with properly.

The $x$ setting is then varied to minimize $\mu$, and results in the readings $x=.25$, $\mu=5$. The $y$ setting is then varied to give a rough balance, and it is found that when $y=.1$, $\mu$ is reduced to 1, which indicates that the range is unnecessarily low; that is, T is too small. To vary T and preserve the rough balance, it is necessary to multiply the values of $x$, $y$ and T by the same factor, and as the rough balance indicates the general proportions between $x$, $y$ and T, it is necessary that the multiplying factor be small enough not to throw the values of $x$ or $y$ off scale. For example, if T were taken as 1, that is five times its initial value, $x$ would have to be raised from .25 to 1.25, which would be off its scale which extends only to unity in the illustrated device. Therefore T is taken as .5, which calls for settings of $x$ and $y$ at .62 and .25 respectively, to maintain the approximate balance. With these settings $\mu$ appears as 4.

$x$ is now adjusted to minimize $\mu$, getting $x=.6$, then $y$ is adjusted to minimize $\mu$ at which point $y=.2$. The meter reading $\mu$ is now apparently zero, indicating that the correct $x$ and $y$ settings have been achieved. However, as a final test of the balance, the input control switches may be thrown to "high input" position. Under these conditions any small residual errors in the $x$ and/or $y$ settings cause a large increase in $\mu$, for example, to an indication of 12. Thereafter slight adjustments of $x$ and $y$ again minimize $\mu$ to give the desired solution. It will be seen that the "high input" provides a type of vernier adjustment to ensure a high degree of accuracy.

It will also be noted in the table below that in the final minimizing of $\mu$, with "high input" the minimum reading which can be secured on the meter 11 is 2 instead of absolute scale zero. This constant deviation from scale zero represents the highly magnified indication of the small losses inherent in any thermionic system, and may be termed the "slide rule" tolerance of the system. It is so infinitesimal as to be indistinguishable in normal or "medium input" operating range and in the "high input" range has only the effect of shifting the operational zero point of $\mu$ from scale zero to scale 2 in the final or vernier adjustment of $x$ and $y$.

For further convenience in illustrating the above described procedure, the steps are listed in tabular form as follows:

| Step | $\mu$ | Input Strength | T | $x$ | $y$ |
|---|---|---|---|---|---|
| set T | ? | Low | .2 | 0 | 0 |
| Raise Input | 15 | Medium | .2 | 0 | 0 |
| Vary $x$ | 5 | do | | .25 | |
| Vary $y$ | 1 | do | | | .1 |
| Readjust T | 4 | do | .5 | .62 | .25 |
| Vary $x$ | 2 | do | | .60 | |
| Vary $y$ | 0 | do | | | .20 |
| Raise Input | 12 | High | | | |
| Balance | 2 | do | .5 | .60 | .20 |

$$X = .60/.5 = 1.20$$
$$Y = .20/.5 = .4$$

The apparatus and method have been illustratively set forth as applied to two equations of two variables, but the device may be constructed for any desired number of variables and corresponding equations, the method of minimizing of $\mu$ with respect to successive variables always providing the required solution. This fact may be demonstrated mathematically as follows:

For input $\epsilon$, the output $f(\epsilon)$ of a diode tube has the characteristics of $\epsilon^2$, that is (a) It is an even function of $\epsilon$ which is zero when and only when $\epsilon = 0$.

(b) $f'$ (the first derivative) exists at every value of $\epsilon$ and is zero at $\epsilon = 0$ and only there.

(c) $f''$ (the second derivative) exists and is bounded from below in every finite interval by a constant bound greater than zero.

Under these hypotheses, consider $n$ variables $x_1 \ldots x_n$, corresponding to $n$ equations $$\Sigma_j a_{ij} x_j + b_i = 0$$

and with $$\epsilon_i = \Sigma a_{ij} x_j + b_i T$$
$$\mu = \Sigma f(\epsilon_i)$$

Using as a starting point $P^0 = \{x_1^0 \ldots x_n^0\}$, let $P^{(s,t)} = \{x_1^{(s,t)} \ldots x_n^{(s,t)}\}$ be the point in the $s$ cycle of successive minimizations which results when $\mu$ has been minimized with respect to the variable $x_t$. Let $\mu^{(s,t)}$ represent the corresponding values of $\mu$, which values converge to some value $m$.

Let $\epsilon^{(s,t)}$ denote the corresponding values of $\epsilon_k$, the error factor. Now $\mu^{(s,t)} \leq \mu^0$, since $\mu$ has been minimized.

Then, since $\mu^0 \geq \mu^{(s,t)}$ and $\mu^{(s,t)} = \Sigma f(\epsilon^{(s,t)})$, $$\mu^0 \geq f(\epsilon^{(s,t)})$$

This indicates that there is some interval in which all the $\epsilon^{(s,t)}$ and 0 (zero) are contained. Let C denote the constant $>0$ which is the lower bound for $f''$ on this interval.

For a point $\{x_1 \ldots x_n\}$ whose $\epsilon_k$'s lie in this interval, $$\frac{\delta^2 \mu}{\delta x_t^2} = \sum_k f''(\epsilon_k) a_{k,t}^2 \geq C\left(\sum_k a_{k,t}^2\right) \geq K$$

where K is a constant $>0$ which depends only upon the given set of coefficients.

Using Taylor's theorem, $$\mu^{(s,t-1)} = \mu^{(s,t)} + \frac{\delta \mu}{\delta x_t}(x^{(s,t-1)} - x^{(s,t)}) + \frac{\frac{\delta^2 \mu}{\delta x_t^2}(x^{(s,t-1)} - x^{(s,t)})^2}{2}$$

Now, at point $P^{(s,t)}$ in consideration, $$\frac{\delta \mu}{\delta x_t} = 0$$

and the remainder derived from Taylor's theorem becomes $$\mu^{(s,t-1)} - \mu^{(s,t)} = \frac{1}{2}\frac{\delta^2 \mu}{\delta x_t^2}(x_t^{(s,t-1)} - x_t^{(s,t)})^2$$

$$\geq \frac{1}{2}K(x_t^{(s,t-1)} - x_t^{(s,t)})^2 = \frac{1}{2}K\overline{(P^{(s,t-1)} P^{(s,t)})^2}$$

Thus since the values of $\mu^{(s,t)}$ converge, for values of the S field sufficiently large the points $P^{(s,1)} \ldots P^{(s,h)}$ in a single cycle may be taken closer together than any prescribed amount.

In a finite region $$\frac{\delta \mu}{\delta X_t}$$

is uniformly continuous, as previously stated, and at point $P^{(s,t)}$ it is zero. Thus with S large as noted, $$\frac{\delta \mu}{\delta X_t}$$

becomes less than a prescribed quantity for all points in a single cycle.

Now at $P^{(s,t)}$, $$\frac{\delta \mu}{\delta X_j} = \sum_k f'(\epsilon_k^{(s,t)}) a_{k,j}$$

If, as shown, these values are very small, and since the $a_{k,t}$ matrix is not singular, all values of $f'(\epsilon^{(s,t)})$ must be small, which in turn indicates that all values of $\epsilon^{(s,t)}$ are small. Thus at point $P^{(s,t)}$ reached by minimizing $\mu$ with respect to the variable $x_t$, the error factor becomes smaller than any given quantity, that is indistinguishable from zero, and consequently is eliminated from the indicated sum of the squares of all error factors. It therefore is evident that by successive minimization of $\mu$ with respect to the other variables, the errors are eliminated one by one to arrive at the complete solution.

Figure 4:
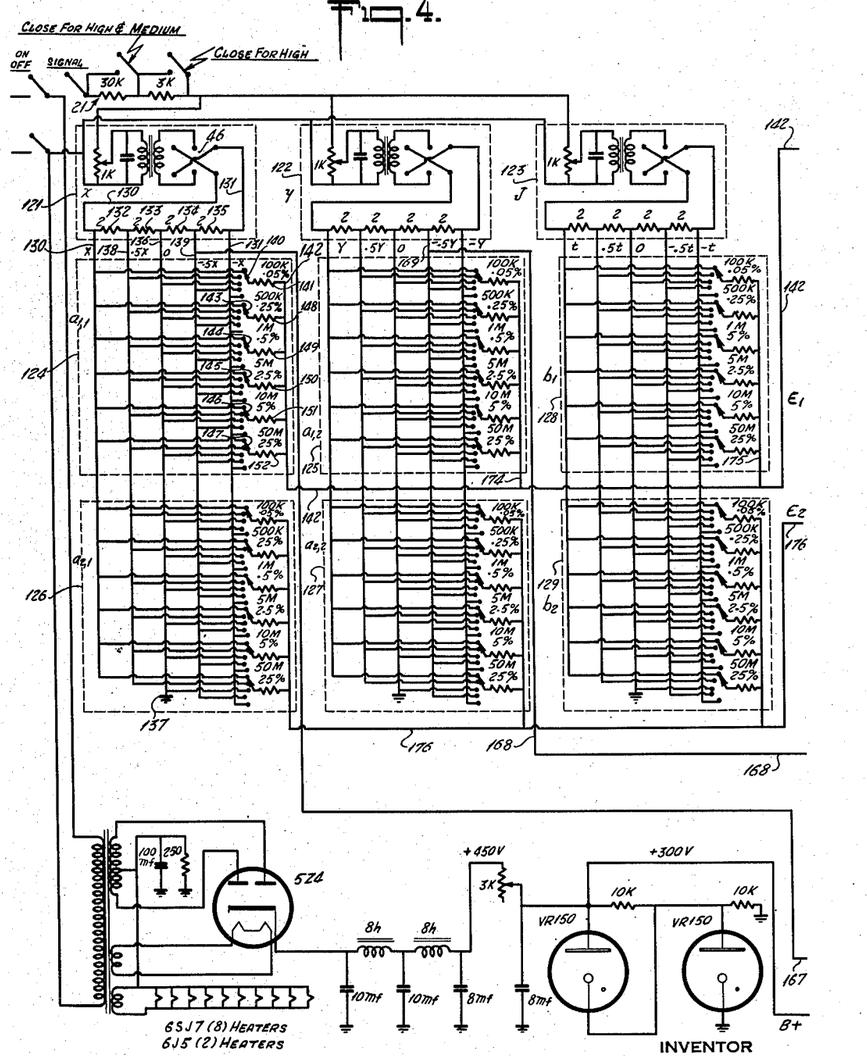
Figures 4 and 4a show a similar schematic wiring diagram of the alternative or high-precision type of instrument.

The embodiment of the invention illustrated in Figure 4, while operating fundamentally in the manner already described, contains certain modifications in the means arriving at the values of $\epsilon_1^2 + \epsilon_2^2$. In this embodiment the coefficient resistance groups have been arranged to allow the coefficients to be entered digitally by closing switches instead of by adjusting potentiometers, thus permitting the entries to be made by any desired switching control means, either manual or by punched cards and the like.

As in the case of Figure 3, the $x$, $y$ and $T$ variable groups 121, 122 and 123 are of similar construction, so that description of the $x$ group 121 may be taken as typical of all three. In the same manner the $a_{1,1}$ coefficient group 124, the $a_{1,2}$ group 125, the $a_{2,1}$ group 126, the $a_{2,2}$ group 127, the $b_1$ group 128, and the $b_2$ group 129 are identically constructed, and $a_{1,1}$ group 124 will be described as typical of all.

Referring to Figure 4, the structure of the $x$ variable group 121 is the same as group 33, Figure 3, except that the output leads 130 and 131 for the reversing switch 46 have connected across them in series a set of four equal resistors 132, 133, 134 and 135. A center tap 136 leads to ground at 137, while intermediate taps 138 and 139 are brought out from the junctions of resistors 132 and 133 and of 134 and 135 respectively. By this arrangement it will be seen that for potentials $+x$ and $-x$ in the leads 130 and 131, the potentials of leads 138 and 136 and 139 will be respectively $.5x$, 0 and $-.5x$.

In the $a_{1,1}$ coefficient group 124, the lead 130, the taps 138, 136 and 139, and the lead 131 may be selectively connected via a five point selector switch 140 of any suitable type to a fixed resistor 141, thence to an $\epsilon_1$ output conductor 142. Five additional five-point selector switches 143, 144, 145, 146 and 147 are similarly adapted to selectively set up connections from the leads 130, 131 and taps 138, 136 and 139 through five fixed resistors 148, 149, 150, 151 and 152 to the common output conductor 142. The resistors 141, 148, 149, 150, 151 and 152 have different fixed values increasing progressively as illustrated for clarity by value figures on the diagram.

By the above arrangement a large number of set resistances in graded combinations can be connected as coefficient $a_{1,1}$ between the $x$ output leads 130 and 131 and the $\epsilon_1$ output conductor 142. For example, using the values shown in the diagram, the resistor 141 has a conductance of 10 micromhos. If this resistor is connected via the switch 140 with the $x$ lead 130, the .5$x$ tap 138, the 0 tap 136, the $-.5x$ tap 139, or the $-x$ lead 131, and considering the potential of output conductor 142 as denoted by $\epsilon_1$, the currents flowing to conductor 142 will be respectively $10x-10\epsilon_1$ microamperes, $5x-10\epsilon_1$ microamperes, $-10\epsilon_1$ microamperes, $-5x-10\epsilon_1$ microamperes, or $-10x-10\epsilon_1$ microamperes. Resistor 148 has a conductance of 2 micromhos. By connecting it via the selector switch 143 with the leads and taps 130, etc., in the order given above, currents of $2x-2\epsilon_1$, $x-2\epsilon_1$, $-2\epsilon_1$, $-x-2\epsilon_1$, or $-2x-2\epsilon_1$ may be selectively caused to flow through resistor 148 to the common conductor 142.

Since the above described connections through resistors 141 and 148 may be made independently but are in parallel, it will be seen that the sum of the two currents delivered to conductor 142 may be given any desired value between $12x-12\epsilon_1$ and $-12x-12\epsilon_1$ by steps of $x$ microamperes.

The next pair of resistors 149 and 150 have resistances ten times as great respectively as those of the first pair 141 and 148 and hence have one-tenth the respective conductances. In the same manner as described above, these resistors may be connected to yield combined currents in the range $1.2x-1.2\epsilon_1$ to $-1.2x-1.2\epsilon_1$ microamperes by steps of $.1x$ microamperes, though for normal operation only the range from $-.9x-1.2\epsilon_1$ to $.9x-1.2\epsilon_1$ is required. In the same manner the third pair of resistors 151 and 152 may be connected to deliver desired currents in the range $\pm.09x-.12\epsilon_1$ microamperes by steps of $.01x$ microamperes. By parallel use of the three pairs of resistors, it is evident that any desired combined current value may be obtained between $12.99x-13.32\epsilon_1$ and $-12.99x-13.32\epsilon$ by steps of $.01x$ microamperes. Thus the coefficient $a_{1,1}$ may be digitally entered anywhere in the range 12.99 to $-12.99$ to the second fractional decimal, the current being in the form $a_{1,1}x-13.32\epsilon_1$.

The $\epsilon_1$ conductor 142 has branches 174 and 175 comprising the output conductors of the $a_{1,2}$ and $b_1$ coefficient groups 125 and 128 respectively, to carry currents $a_{1,2}y-13.32\epsilon_1$ and $$-b_1T-b_1T-13.32\epsilon_1$$

By the current law, the sum of these currents must equal zero, and hence $$a_{1,1}x+a_{1,2}y-b_1T=39.96\epsilon_1$$

an equation which determines the voltage $\epsilon_1$.

In a similar manner a common conductor 176 is connected to the variable groups 121, 122 and 123 via the coefficient groups 126, 127 and 129 respectively, and carries a potential corresponding to $$a_{2,1}x+a_{2,2}y-b_2T=39.96\epsilon_2$$

Having thus provided voltages proportional to $\epsilon_1$ and $\epsilon_2$, the present circuit differs from that of Figure 3 in the method of securing values corresponding to $\epsilon_1^2$ and $\epsilon_2^2$. Consider the functional relationship between a voltage $e$ impressed on the grid of a suitable vacuum tube and the plate current $I_p$: Suppose this relationship is expressed by the relation $$I_p=I_0+g_me+ke^2$$

where $g_m$ and $k$ are factors derived from the characteristics of the tube. Suppose then that a voltage $e_0 \sin wt$ is applied to the grid. The output current then is $$I=I_0+g_me_0 \sin wt+ke_0^2 \sin^2 wt$$

$$=I_0+\tfrac{1}{2}ke_0^2+g_me_0 \sin wt-\frac{ke_0^2}{2}\cos 2wt$$

If this current is applied to a network which discriminates against the D. C. and the original frequency but gives a large voltage output for the second harmonic, the output will be proportional to $e_0^2$ which is the desired result.

Figure 4A:
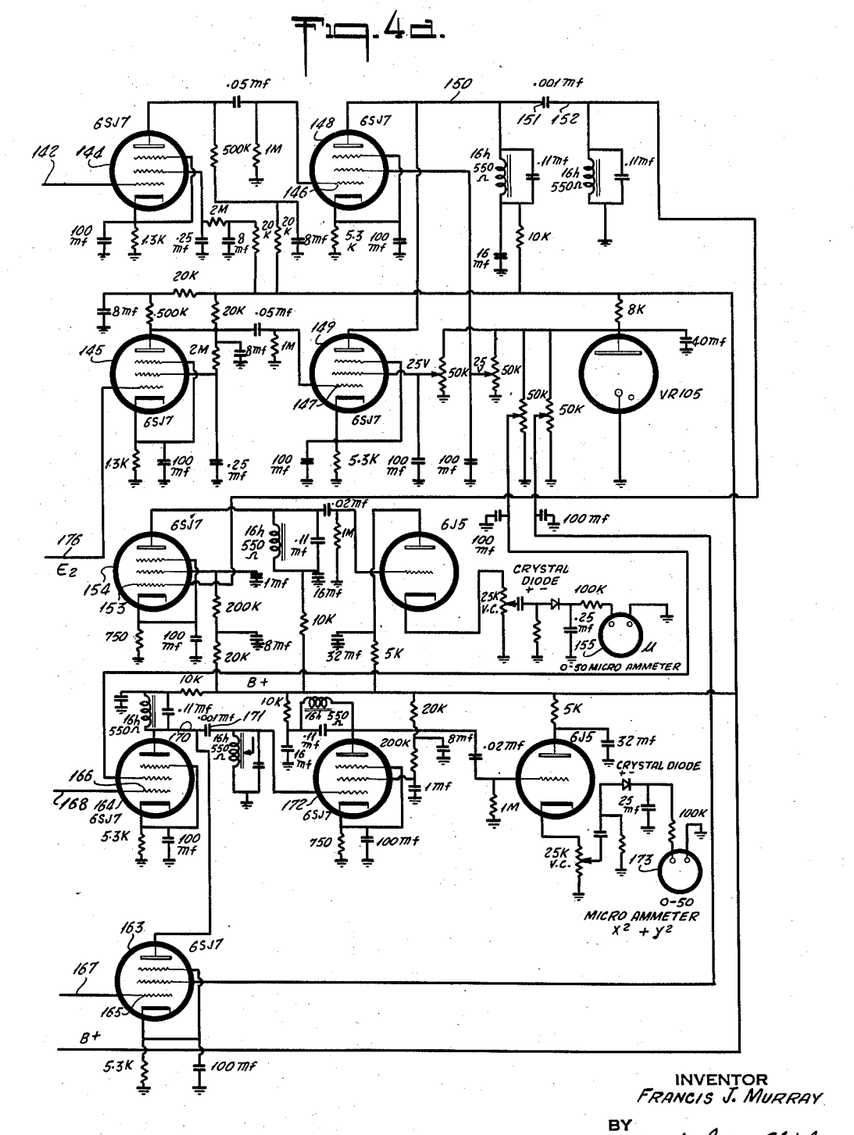

In the present illustrative circuit the potentials of conductors 142 and 176 are first amplified by means of suitable tubes 144 and 145 respectively, and the output voltages of these tubes are impressed on the grids 146 and 147 of a pair of "squaring" tubes 148 and 149 respectively. The plate currents of the latter tubes are combined in a conductor 150 to flow through a circuit resonant to 120 cycles as shown on the diagram. A blocking condenser 151 applies the resultant voltage via a conductor 152 to a second resonant circuit associated with the grid 153 of an amplifying tube 154 whose plate circuit is also resonant to 120 cycles as shown. From this point the remainder of the circuit is a cathode follower linear detector which leads the final current corresponding to $$\epsilon_1^2+\epsilon_2^2=\mu$$

to the micro-ammeter 155.

The operation of the device for solving equations is the same as that described for the form shown in Figure 3 except, as previously noted, the coefficient values are entered digitally by setting the selector switches in groups 124, 125, 126, 127, 128 and 129 manually, or by any other suitable means.

The details of the circuit described and shown can be varied to some extent, but there are certain design requirements which must be fulfilled as follows:

Let $E_0$ be the output voltages of the transformers

Let $n$ be the number of equations

Let $\epsilon$ be the fraction of a coefficient to which the equations are to be balanced; i. e., if our coefficients range from $-1$ to 1 and we wish our equations balanced to .001, then $\epsilon=.001/1=.001$ $\sigma$ the presquaring amplification factor $e_0$ the minimum voltage signal to be squared $\alpha_{60}$ the 60 cycle amplification of the post-squaring circuit expressed as a voltage for a given squaring current.

$\alpha_{120}$ the similar quantity for 120 cycles.

Then $\sigma$ must be such that the difference in phase shifts of the outputs of two distinct presquaring amplifiers must be less than 1° 30' for $\mu$ errors of less than one part in a thousand.

$$e_0=\frac{E_0}{2.632(n+1)}$$

(For $\sigma=100$, $\epsilon=.001$, $n=12$, $E_0=10$, we get $e_0=.03$)

Let $V_0$ be the minimum output voltage which is acceptable and suppose the 60 cycle output must be less than a tenth of this. Then $$\alpha_{120}\frac{e_0^2k}{2}=V_0 \qquad \alpha_{120}=\frac{2V_0}{e_0^2k}$$

$$\alpha_{60}e_0g_m<\frac{1}{10}V_0 \qquad \alpha_{60}<\frac{V_0}{10e_0g_m}$$

where $k$ and $g_m$ must be calculated from the tube characteristics.

For the operational situation indicated on the circuit, $k=.000650$ ampere per volt squared, $g_m=.000750$ ampere per volt.

Thus $$\frac{\alpha_{120}}{\alpha_{60}} \geq 20 \frac{g_m}{ke_0}$$

(Under the assumptions previously mentioned this is about 700, which is readily attained in the tuned circuits each of which is theoretically capable of discriminating by a factor of 33 to one).

It will be noted that $\sigma$ can be reduced by a factor $\lambda$ if $a_{120}$ is increased by the square of $\lambda$. Since there is only one channel after squaring, this means that variations of two stages after squaring are equivalent to variations of $n$ pre-squaring states, i. e. to add two post-squaring stages is as effective as adding $n$ pre-squaring stages, one for each equation. However, the circuit discrimination must also go up with $\lambda$.

The values of the capacities in each resonant circuit are to be adjusted to resonance. There are also RC circuits which can be used, subject to the limitations stated above.

One must also consider the time delays in the circuit. These are RC for the interstage capacitative couplings and $$\frac{2L}{R}$$

for the resonant circuits. This total time delay should not exceed .25 second. Otherwise the operator is handicapped by the slowness of the response.

The method of squaring provided in the circuits shown in Figures 4 and 4a avoids the plate current $I_0$ and is also free of drift effects which would appear in direct current square law detection.

Figure 5:
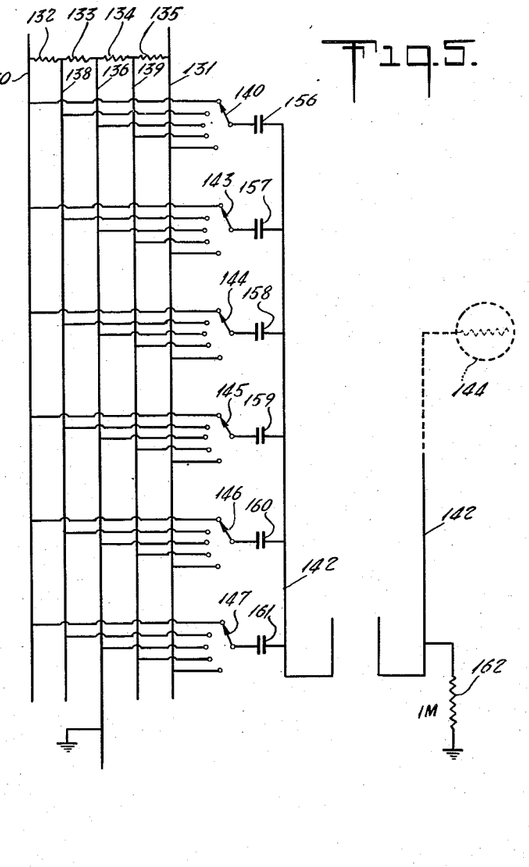
Figure 5 is a detail diagrammatic illustration of the substitution of capacitative conductances for resistive conductances in the coefficient groups, Figure 4.

In the form of the invention described above, the coefficient groups have employed resistive conductances. For certain applications the resistive conductances may be replaced by capacitative conductances as generally illustrated in Figure 5. In this case, taking the $a_{1,1}$ group 124a as typical of all coefficient groups, the leads and taps 130, 131, 136, 138 and 139 are selectively connected to the common output conductor 142 through suitably graded condensers 156, 157, 158, 159, 160 and 161. The common $e_1$ conductor 142, which leads to the grid of tube 144, is also connected to ground through a resistor 162 to provide the grid with a direct current path to ground.

The result of this arrangement is merely to change the coefficients of $\epsilon_1$ in the equation $$\sum_{j=1}^{h} a_{i,j} x_i - b_i T = A \epsilon_1$$

If the original voltage division remains resistive, that is, determined by resistors 132, 133, etc., the loading effects of the coefficient network on this division are to the first order phase shifts rather than magnitude effects and the system is less sensitive to the loading. Under certain circumstances, for example, when higher input frequencies are to be used, the same effect as above may be obtained by employing a capacitive voltage division and a resistance network of the type shown in Figure 4 in the coefficient groups.

Referring again to Figures 4 and 4a, it will be seen that the instrument includes two auxiliary "squaring" tubes 163 and 164, having their grids 165 and 166 connected via leads 167 and 168 with the $-.5x$ output tap 139 of $x$ variable group 121 and the similar $-.5y$ output tap 169 of the $y$ variable group 122 respectively. The plate currents of tubes 163 and 164, combined in a conductor 170 forming part of a circuit resonated to 120 cycles, have their resultant potential passed via a blocking condenser 171 through a single stage of amplification also resonant to 120 cycles and including a tube 172, the amplified output being led through a cathode linear follower detector as shown, to a second microammeter 173. It will be seen that the arrangement is essentially the same as that described for the derivation of $\epsilon_1^2 + \epsilon_2^2$, that is, when the voltages $-.5x$ and $-.5y$ are impressed on the grids 165 and 166 of the squaring tubes 163 and 164, the reading of the meter 173 represents a value proportional to $x^2 + y^2$. Obviously the grid inputs could be taken from the $x$ and $y$ output leads themselves instead of the $-.5x$ and $-.5y$ taps with no basic difference, the lower input values being chosen herein for convenience and for keeping the indicated resultant in proper range on the meter 173.

The principal purpose of the auxiliary circuit just described is to facilitate the solution of certain types of problems involving the derivation of the characteristic vectors of a symmetric matrix. The highly developed mathematical theory involved in the solution of such problems is well known and need not therefore be set forth herein in detail, except to state the well known principle that with a symmetric matrix all characteristic vectors can be derived provided either the maximum or minimum vector can be found.

To illustrate the use of the present invention to locate the limiting values, take the symmetric matrix $$\begin{Vmatrix} a_{1,1} & a_{1,2} \\ a_{2,1} & a_{2,2} \end{Vmatrix}$$

The rows of this matrix are entered in the machine as the coefficient of $x$ and $y$ in the manner previously described, $T$ being set to zero, thus eliminating the constant $b$. The output reading of the meter 155 then represents $$\mu = (a_{1,1}x + a_{1,2}y)^2 + (a_{2,1}x + a_{2,2}y)^2$$

and by the above mentioned well-known mathematical theory, the maximum value of $\mu$ under these circumstances corresponds to the values of $x$ and $y$ representing the maximum characteristic vector of the matrix so long as $x^2 + y^2 = a$ constant.

As previously noted, the indication of the second meter 173 is proportional to $x^2 + y^2$ at all times. The operator therefore enters any desired settings of $x$ and $y$ which will give a convenient scale reading of the meter 173, for example, scale 1. The settings of $x$ and $y$ are then varied at the same time in such a manner as to keep the above scale reading constant, and the indication of $\mu$ is observed on the first meter 155. When $\mu$ reaches a maximum, that is, when any further variation in $x$ and $y$ causes a decrease in $\mu$, the settings of $x$ and $y$ correspond to the maximum characteristic vector or roots of the matrix.

In a similar manner, varying $x$ and $y$ together, with $x^2 + y^2$ constant, until $\mu$ assumes a minimum on the meter 155, gives the $x$ and $y$ values corresponding to the minimum characteristic vector.

As previously stated, while the apparatus is illustrated herein as adapted to the solution of problems of two variables and equations, it may be constructed with provision for any practical number of variables and coefficients. When constructed for more than two variables the device is operated in the same manner as described to derive the maximum and minimum characteristic vectors, except that in the case of more than two variables, each is varied with every other variable in pairs successively, while keeping the sum of the squares constant, until the conditional maximum or minimum reading of $\mu$ is observed on the meter 155.

The structure of the device when equipped for any desired number of variables and coefficients is generally the same throughout as shown and described herein, the additional required variable and coefficient groups and their attendant connections, tubes, etc., being incorporated in the same manner to give a reading of $\mu$ on the meter 155 and an indication of the sum of the squares of all variables on the meter 173. If desired, an additional coefficient group may be incorporated to add a term $-\lambda x$ to the first equation illustrated herein and a term $-\lambda y$ to the second equation, this provision facilitating the location of other roots between the maximum and minimum characteristics.

While the invention has been described in preferred form as noted, it is not limited to the precise structure illustrated, as various changes and modifications may be made without departing from the scope of the appended claims.

What is claimed is:

1. That method of solving simultaneous linear equations having unknown variables and known coefficients associated therewith which includes the steps of setting up electrical conductances corresponding to said coefficients in parallel circuit carrying means, entering initial electrical values corresponding to said variables in said circuit forming means to produce outputs from said conductances corresponding to said initial entered values of said variables modified by said respective coefficients, combining said outputs for each of said equations to produce a single electrical value for each equation proportional to the total error of said equation due to incorrectness of said initially entered values of said variables, impressing said equation error values on parallel electronic circuits adapted to produce outputs proportional to the squares of said equational errors, combining said electronic circuit outputs to produce a single electrical value proportional to the sum of said squares of said equational errors, measuring said last named single electrical value to produce a quantitative error indication of said sum of said squares, successively varying the setting of each of said variable entry values while keeping the others constant to produce final variable settings giving minimum values of said total error indication, and observing said final setting of said variable entries.

2. The method claimed in claim 1 including the step of initially introducing in said combined circuits an additional electrical entry comprising a gage variable to bring said quantitative error indication into convenient scalar magnitude, and the final step of dividing said final variable entries by said gage variable.

3. The method claimed in claim 1 including the steps after completion of said successive minimizations, of increasing the electrical magnitude of all said variable entries in a predetermined proportion whereby any residual error in said error indication may be magnified, and re-adjusting said variable settings successively to minimize said magnified error indication.

4. That method of solving simultaneous linear equations which includes the steps of entering trial electrical values corresponding to trial values of the unknowns of each of said equations into modifying combination with electrical factors corresponding to the known respective coefficients of said unknowns, whereby a single electrical value may be established for each of said equations proportional to the error therein due to deviation of said trial unknown values from the correct values, electronically establishing electrical values proportional to the squares of said electrical error values, electrically combining said squared error values to produce a combined single error value proportional to the sum of the squares of said individual equation error values, and individually altering said trial electrical values to produce successive minimizations of said single combined error value, whereby the final values of said electrical entries producing said minimizations may proportionally indicate the correct values of said unknowns.

5. In a device for solving simultaneous linear equations having unknown quantity symbols and known coefficients thereof, in combination, a source of alternating current, a plurality of transformers connected to said source of current and at least equal in number to the number of said unknown quantities, each of said transformers comprising an entry means for values of one of said unknown quantities, calibrated means to individually vary the output voltages of each of said transformers in proportion to desired numerical entries of said respective unknowns, means forming separate conductances for each of said coefficients and each having a potential output conductor, the conductance means corresponding to the coefficients of each of said unknown factors in all said equations being connected to the output conductors of said corresponding unknown factor transformer, calibrated variable means associated with each of said conductances and settable in correspondence with the numerical values of said respective coefficients to set up potentials in said potential output conductors proportional to said respective unknown factor entries modified by said respective coefficients, conducting means to combine said proportional output potentials to form a single potential for each of said equations, electronic means to separately amplify said equational potentials in equal proportion, electronic means controllable by said equational potentials to produce currents proportional to the squares of said equational potentials, means to add said currents, and indicating means to measure said current sum.

6. A device as claimed in claim 5 including reversing switches adapted to selectively interchange the polarities of said output conductors of said unknown quantity transformers and reversing switches adapted to selectively interchange the polarity connections from said unknown quantity transformer conductors to each of said coefficient conductance means, whereby the signs of said entered unknown factors and coefficients may be selectively changed.

7. A device as claimed in claim 5 wherein each of said coefficient conductance means includes a fixed resistor and the resistance member of a potentiometer of matched total resistance connected respectively between said two transformer output conductors and ground, and wherein said coefficient setting means includes the movable contact of said potentiometer connected to said potential output conductor.

8. A device as claimed in claim 5 wherein said output conductors of said transformers are bridged by a resistor having a plurality of intermediate taps including a grounded center tap, and wherein each of said conductance means includes a plurality of resistors of graded resistances, each of said resistors having one terminal selectively connectible by switching means to any one of said respective transformer output conductors or taps and its other terminal connected to said output potential conductor.

9. A device as claimed in claim 5 including means between said source of current and said transformers to change the potential delivered by said source to said transformers, whereby the indicated magnitude of said measured current sum may be adjusted.

10. A device as claimed in claim 5 wherein said output conductors of each of said transformers are bridged by a resistor having a plurality of intermediate taps including a grounded center tap, and wherein each of said conductance means includes a plurality of condensers of predetermined graded capacities, each of said condensers having one terminal selectively connectable by switching means to any one of said respective transformer output conductors or taps and its other terminal connected to said output potential conductor, said output potential conductor having a resistive connection to ground.

11. A device as claimed in claim 5 wherein the output conductors of each of said transformers are bridged by a resistor having a plurality of intermediate taps including a grounded center tap, wherein each of said conductance means includes a plurality of resistors of predetermined graded resistances, each of said resistors having one terminal selectively connectable by switching means to any one of said respective transformer output conductors and taps and its other terminal connected to said output potential conductor, and including electronic means connected to corresponding output voltage conductors or taps of said transformers and adapted to set up electrical values proportional to the squares of the potentials of said corresponding transformer output conductors or taps, means to add said proportional squared electrical values, and second indicating means to measure said last named sum of said squares.

12. That method of solving simultaneous mathematical equations having unknown variables and known coefficients, which includes the steps of entering electrical factors proportional to trial unknowns and other electrical factors proportional to said known coefficients throughout said equations in an electrical combination to produce a scalar indication proportional to the sum of the squares of the initial errors in said equations due to incorrectness of said trial electrical entries and individually changing said trial electrical entries to produce successive minimizations of said error indication.

13. In a device for solving simultaneous linear equations having unknown factors and known coefficients associated therewith, in combination, electrical means including variable sources of current and means forming variable conductances in circuit therewith to establish a potential for each of said equations proportional to the total error produced in said equation by entry in said means of electrical factors representative of said known coefficients and trial values of said unknown factors, means responsive to said potentials to set up electrical values proportional to the squares of said errors, means to establish an electrical value proportional to the sum of said squares, and indicating means to measure said value.

14. In a device for solving simultaneous linear equations having unknown factors and known coefficients associated therewith, in combination, electrical means including variable sources of current and means forming variable conductances connected in circuits therewith to establish a potential for each of said equations proportional to the error produced in said equation by entry in said means of electrical factors representative of said known coefficients and trial values of said unknown factors, electronic means responsive to said equational error potentials to establish a single electrical value proportional to the sum of the squares of said equational errors, and indicating means to measure said single electrical value.

15. A device as claimed in claim 14 wherein said sources of current are of predetermined alternating frequency, wherein said circuits are resonant to said frequency, and wherein said electronic means includes an output circuit resonant to a predetermined harmonic of said frequency.

16. A device as claimed in claim 14 wherein said sources of current are of predetermined alternating frequency, wherein said circuits are resonant to said frequency, and wherein said electronic means includes an output circuit resonant to the second harmonic of said predetermined frequency.

17. A device as claimed in claim 14 in which said electronic means includes diode combinations adapted to provide outputs proportional to the square of their inputs, said inputs being proportional to said equational error potentials.

18. A device as claimed in claim 14 in which said electronic means includes means to amplify said equational error potentials in equal ratio, diode combinations adapted to produce outputs proportional to the squares of their inputs, said inputs being responsive to said amplified equational error potentials, and means between said diode combinations and said indicating means to amplify said single electrical value.

19. That method of deriving the maximum vector of a symmetric mathematical matrix comprising the known coefficients of a set of simultaneous linear equations having unknown variable factors associated with said coefficients, which includes the steps of entering electrical factors proportionally representative of said known coefficients and trial values of said unknowns in electrical combination to establish an electrical value proportional to the algebraic sum of the products of said variable factors and their respective coefficients for each of said equations, setting up an electrical value proportional to the sum of the squares of said algebraic sums, electrically producing an indication proportional to the magnitude of said sum of said squares, electrically establishing a second indication proportional to the sum of the squares of said trial variable factors unmodified by their respective coefficients, and changing said variable factor entries to maximize said first indication while maintaining said second indication constant.

20. In a device of the character described, in combination, a source of current, a plurality of transformers electrically connected to said source, means forming individual conductances connected in circuit with the secondary windings of each of said transformers, adjustable means to tap off a predetermined individual fractional potential from each of said conductances, conducting means to combine said fractional potentials, means forming second individual conductances connected to said secondary windings of each of said transformers in respective parallel with said first conductances, adjustable means to tap off a predetermined individual fractional potential from each of said second conductances, conducting means to combine said second fractional potentials, electronic means responsive to said combined potentials to establish electrical values proportional to the squares of said first and second combined potentials, conductive means to add said electrical values, means to measure the sum of said added values, and means to individually vary the output voltages of said transformer secondary windings.

FRANCIS J. MURRAY.

REFERENCES CITED

The following references are of record in the file of this patent:

UNITED STATES PATENTS

| Number | Name | Date |
|---|---|---|
| 2,404,387 | Lovell | July 23, 1946 |
| 2,417,098 | Wilcox | Mar. 11, 1947 |
| 2,446,191 | Pemberton | Aug. 3, 1948 |

OTHER REFERENCES

Electronic Computers, by Wm. Shannon, an article in the August 1946 issue of Electronics, pages 110 to 113.